United States Patent [19]

Gondouin

[11] Patent Number: 4,706,751
[45] Date of Patent: Nov. 17, 1987

[54] HEAVY OIL RECOVERY PROCESS

[75] Inventor: Michel Gondouin, San Rafael, Calif.

[73] Assignee: S-Cal Research Corp., San Rafael, Calif.

[21] Appl. No.: 824,521

[22] Filed: Jan. 31, 1986

[51] Int. Cl.$^4$ ............... E21B 43/24; E21B 43/30; E21B 43/40

[52] U.S. Cl. ............... 166/272; 166/50; 166/245; 166/263; 166/266; 166/300

[58] Field of Search ........... 166/260, 270, 272, 303, 166/302, 300, 50, 263, 245, 266

[56] References Cited

U.S. PATENT DOCUMENTS

| | | | |
|---|---|---|---|
| 3,102,588 | 9/1963 | Fisher | 166/261 |
| 3,482,630 | 12/1969 | Earlougher, Jr. | 166/260 |
| 3,986,556 | 10/1976 | Haynes | 166/260 X |
| 4,050,515 | 9/1977 | Hamrick et al. | 166/59 X |
| 4,159,743 | 7/1979 | Rose et al. | 166/59 X |
| 4,237,973 | 12/1980 | Todd | 166/59 |
| 4,377,205 | 3/1983 | Retallick | 166/59 |
| 4,397,356 | 8/1983 | Retallick | 166/59 X |
| 4,445,570 | 5/1985 | Retallick | 166/59 |
| 4,458,756 | 9/1984 | Clark | 166/262 X |
| 4,501,326 | 2/1985 | Edmunds | 166/50 X |

Primary Examiner—Stephen J. Novosad

[57] ABSTRACT

Heavy oil is recovered from deep reservoirs by injection of a gaseous mixture containing hydrogen, steam and in some cases oil soluble gases and/or vapors. This mixture is produced by a reversible exothermic catalytic reaction in a down-hole reactor and injected into a well drilled, preferably horizontally, into the reservoir. The reactor feed streams are prepared in surface facilities with low air pollution, using as feedstocks water, air and inexpensive fuels, such as natural gas, coke or residual fuel oil.

The heavy oil contacted by the injected gaseous mixture is formed into a mobile oil bank of reduced viscosity, which is produced to the surface by means of production wells or by alternatively using the injection well in a production mode. The process is of particular interest for reservoirs deeper than 1,000 feet, located in the vicinity of natural gas fields, oil refineries or coal mines.

14 Claims, 11 Drawing Figures

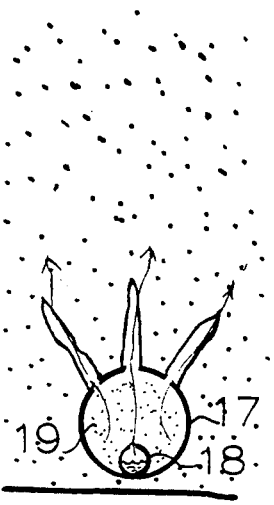
fig.5 SECTION AA
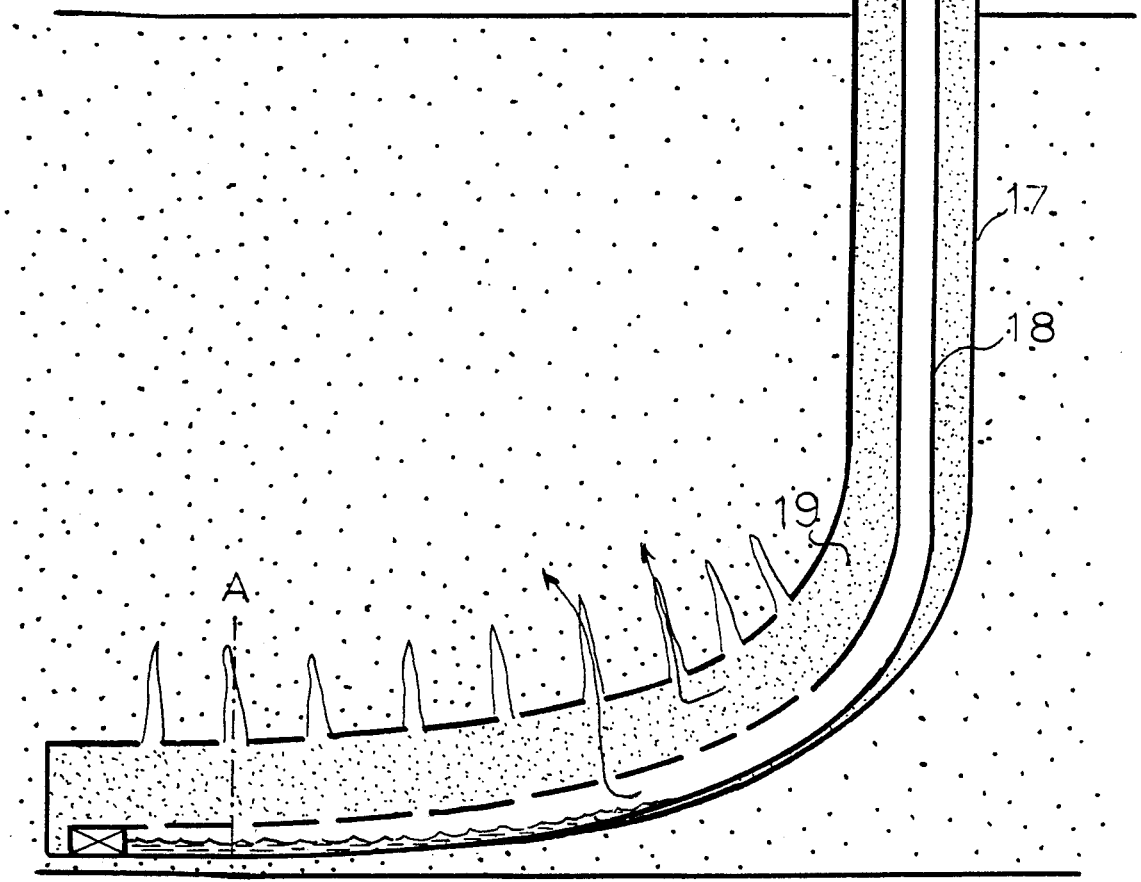
fig.4

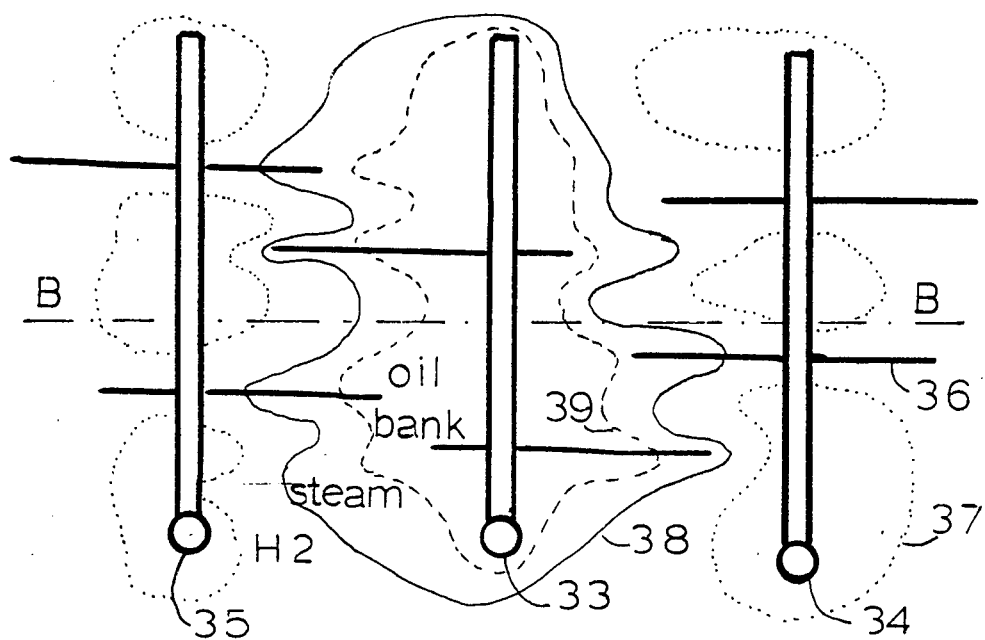
fig.10
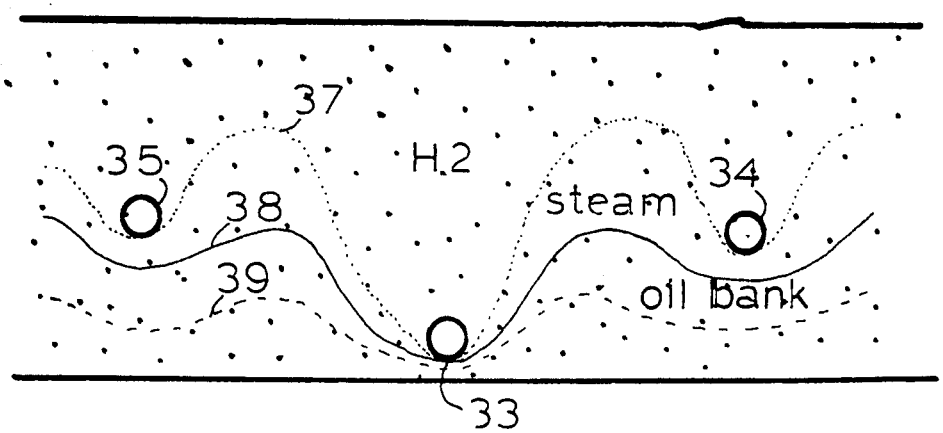
fig.11 SECTION BB

HEAVY OIL RECOVERY PROCESS

FIELD OF THE INVENTION

The field of art to which the invention pertains includes the field of petroleum recovery processes applicable to heavy oil reservoirs. The process described herein includes surface and downhole facilities for producing the reactant streams required for downhole production of a suitable fluid mixture to be injected in the reservoir. The process makes use of known reactions (some of them catalytic) to produce the reactants, on the surface using inexpensive fuels, air, and water only as feeds. Other catalytic reactions take place downhole and provide the heat required to vaporize water into steam at the reservoir pressure. Fluid handling facilities include compression at the surface and a specialized flow control system downhole. The injected fluid mixture reacts "in situ" with the heavy oil to reduce its viscosity and specific gravity, thus allowing it to flow towards the producing wells where it is lifted to the surface by conventional means.

In one of the embodiments of the invention, the same injection well is also alternately used for production after each period of fluid injection. This mode of operation is similar to the known "Huff and Puff" mode of heavy oil recovery by steam injection. The injection well is preferably drilled horizontally or at a high deviation angle near the base of the reservoir. By-product gases and vapor released to the atmosphere in this process are essentially non-polluting.

BACKGROUND AND SUMMARY OF THE INVENTION

There are very large heavy oil reserves in many countries, US, Canada, Venezuela, USSR, Trinidad, Malagasy, Brasil, etc.... Conventional primary recovery techniques are unapplicable because the high viscosity of these oils, often in excess of 1000 centipoises, prevents them from flowing freely to the surface. Various other recovery methods are used instead, the application of which is mostly depth limited. For very shallow oil sands, open pit mining methods and separation of the oil from the sand in surface installations are commonly used. For deeper reservoirs, steam injection from the surface is used generally, but its effectiveness is limited in most cases to about a 2500 FT depth. At such depths, heat losses in surface steam lines and in the well bore reduce the steam quality from a maximum of about 0,9 at the surface boiler down to less than 0,5, a value generally insufficient to provide the high heat rate into the reservoir required for an economical oil flow rate.

To overcome this limitation, various attempts have been made to locate the steam boiler downhole, but disposal of the combustion gases produced from inexpensive fuels such as diesel fuel or lease crude has prevented the industrial application of this technique. When these gases are returned to the surface, they constitute a source of atmospheric pollution, and, when they are injected into the reservoir, their acid content and very high temperature promote rapid corrosion of the well, tubing and casing and downhole burner.

The present invention relates to a process for catalytically creating "in situ" a mixture of steam, hydrogen, various permanent gases, and vapors soluble in the heavy oil. Such a mixture is capable of reducing the heavy oil viscosity when in contact with it for extended periods of time in the reservoir. Because the catalytic reaction is reversible, it proceeds at a finite rate which is controllable, as opposed to fuel combustion, which proceeds by a chain reaction of free radicals at an uncontrollable rate. The temperature achievable in those exothermic catalytic reactions is much lower than that of combustion, but it is sufficient to generate steam at a pressure at least equal to that of the heavy oil reservoir. Because the reactions are taking place within the reservoir itself, the steam produced is no longer subjected to very large heat losses between the point at which it is produced and the point at which it is injected. Regardless of depth, the temperature of the catalytic reactions "in situ" can be controlled by adjusting automatically the non-stoichiometric composition of the reactants injected into the catalytic reactor. The quality of the steam injected into the reservoir is no longer dependent on depth. In one of the embodiments, the catalyst is in a fixed bed, packed in the annular space between the casing and tubing of a well drilled nearly horizontally near the base of the heavy oil reservoir.

In another embodiment, the downhole catalytic reactor is a vertical slurry reactor feeding steam, hydrogen, and oil soluble reaction products into a horizontal liner for injection into the heavy oil zone. In that case, the vertical portion of the well is equipped with a large diameter cemented casing and the catalytic reactor is located in the upper part of the heavy oil zone, or in an overlaying shale bed.

In all cases, one of the reactants (steam or oxygen) is supplied to the downhole reactor through a separate feeder tubing, while the other reactant (CO or $H_2$) is supplied via the casing-tubing annulus. In the case of a vertical slurry reactor, the catalyst and suspension liquid are also supplied to the reactor by means of a second feeder tubing, preferably concentric with the first one. The two feeder tubings may also be used intermittently for circulating the spent catalyst slurry to the surface for regeneration or for disposal. Conventional oil field equipment (tubing hanger, multicompletion packers, downhole valves, etc . . . ) are used for the downhole connections to the catalytic reactor and to the injection well.

The horizontal injection well may be drilled into the heavy oil zone itself, or in the underlying aquifer immediately below the water/oil contact. When the lower boundary of the heavy oil zone is a shale layer, the well may be drilled also partly into the shale layer, at or near the boundary contact surface, provided that communication from the well into the heavy oil zone is established through vertical perforations or vertical fractures intersecting the horizontal well and penetrating into the heavy oil zone. The injection well casing or liner may or may not be cemented to the surrounding rock formation.

The products of the catalytic reaction taking place in the downhole reactor include as primary constituents: hydrogen, high quality steam and sometimes oil soluble permanent gases, such as carbon dioxide or methane or oil soluble vapors such as methanol. Minor impurities in the gas injected into the heavy oil zone may include the unconverted reactants (CO, $O_2$). When the heavy oil is contacted by this gaseous mixture, its viscosity is greatly reduced as a result of the following phenomena occuring successively:
    heating of the heavy oil by the condensing steam,
    swelling of the heavy oil by dissolution of gases
       ($CO_2$, $CH_4$) and/or soluble vapors (methanol), hydrogenation of the hot heavy oil by hydrogen catalyzed by the heavy metals (Ni, V, etc . . . ) originally present in the heavy oil and by the clay minerals present in the reservoir rock. This catalytic hydrogenation proceeds at a rate which is determined by heat input provided by condensation of the injected steam into the reservoir.

Pressure in the injection well is maintained at a value as high as possible. Due to the injection pressure, the reservoir connate water is displaced by the injected fluids, by the the heavy oil swelling and by the by-product gases ($CH_4$ for instance) generated by the heavy oil "in situ" hydrogenation.

The heavy oil of reduced viscosity becomes mobile and flows together with the injected steam and gases into the portion of the pore space initially occupied by the displaced connate water thus forming a mobile oil bank which steadily grows around the injection well.

In a preferred embodiment, the injection well also serves alternatively as production well after each period of fluid injection ("huff and puff" mode of operation). In another embodiment a plurality of production wells drilled vertically are located in two parallel rows, one on each side of the horizontal injection well. To facilitate the drainage of the connate water displaced by the injected fluids and the resulting oil bank, the fluids in the production wells are subjected to artificial lift by pumping or gas lift. This increases the total flowing pressure gradients in the reservoir portion of the heavy oil zone located between injection and production wells. Flow communication between wells may also be enhanced by known techniques, such as hydraulic fracturing. Under the combined effects of the injection pressure in the injection well and of the pumping in the production wells, flow is established in the reservoir. At first the flowing fluids at the production wells are composed primarily of connate water and condensed steam. With the steady expansion of the mobile oil bank, oil and gas flow rates into the production wells increase in time to reach a peak. The decline in production is caused by gravity segregation of the live steam and premanent gases towards the upper part of the heavy oil zone and by their break-through into the production wells. The total oil production rate decline may then be retarded by squeezing cement into the top perforations of the production wells which are subject to steam and gas break-through. In this way a greater portion of the heavy oil initially present in the lower part of the reservoir can be swept by the injected fluids and recovered before the oil rate in the production wells become uneconomic.

Recovery of heavy oil in an entire field is achieved by a combination of similar patterns in which each horizontal injection well alternates with at least one row of vertical production wells.

A plurality of horizontal wells operating intermittently in the injection mode and in the production mode may also be used. Well spacing in both cases is determined by the heat rate and temperatures achievable by the steam condensation, such that the hydrogenation reaction with heavy oil can proceed to equilibrium within the life time of the pattern. The orientation of the horizontal wells is preferentially prependicular to the direction of any natural fracture network in the reservoir.

In another embodiment, each row of vertical production wells is replaced by one or several horizontal wells intersecting a series of vertical fractures. The horizontal production wells are preferably parallel to the injection well but located at some vertical distance above the base of the reservoir to reduce water production by water coning in the vertical fractures.

BRIEF DESCRIPTION OF THE DRAWINGS

FIG. 4 is a longitudinal cross section of the horizontal portion of an injection well, including a fixed bed catalytic reactor and a downhole automatic flow control system.

FIG. 5 is a transverse cross section of the catalytic reactor and injection well of FIG. 4.

FIG. 10 is a surface map showing an application of horizontal production wells intersecting vertical fractures to replace rows of vertical production wells.

FIG. 11 is a vertical cross section showing the relative depths of the horizontal injection and production wells within the heavy oil zone in the case of FIG. 10.

DESCRIPTION OF THE DOWNHOLE CHEMICAL PROCESS

Figure 1:
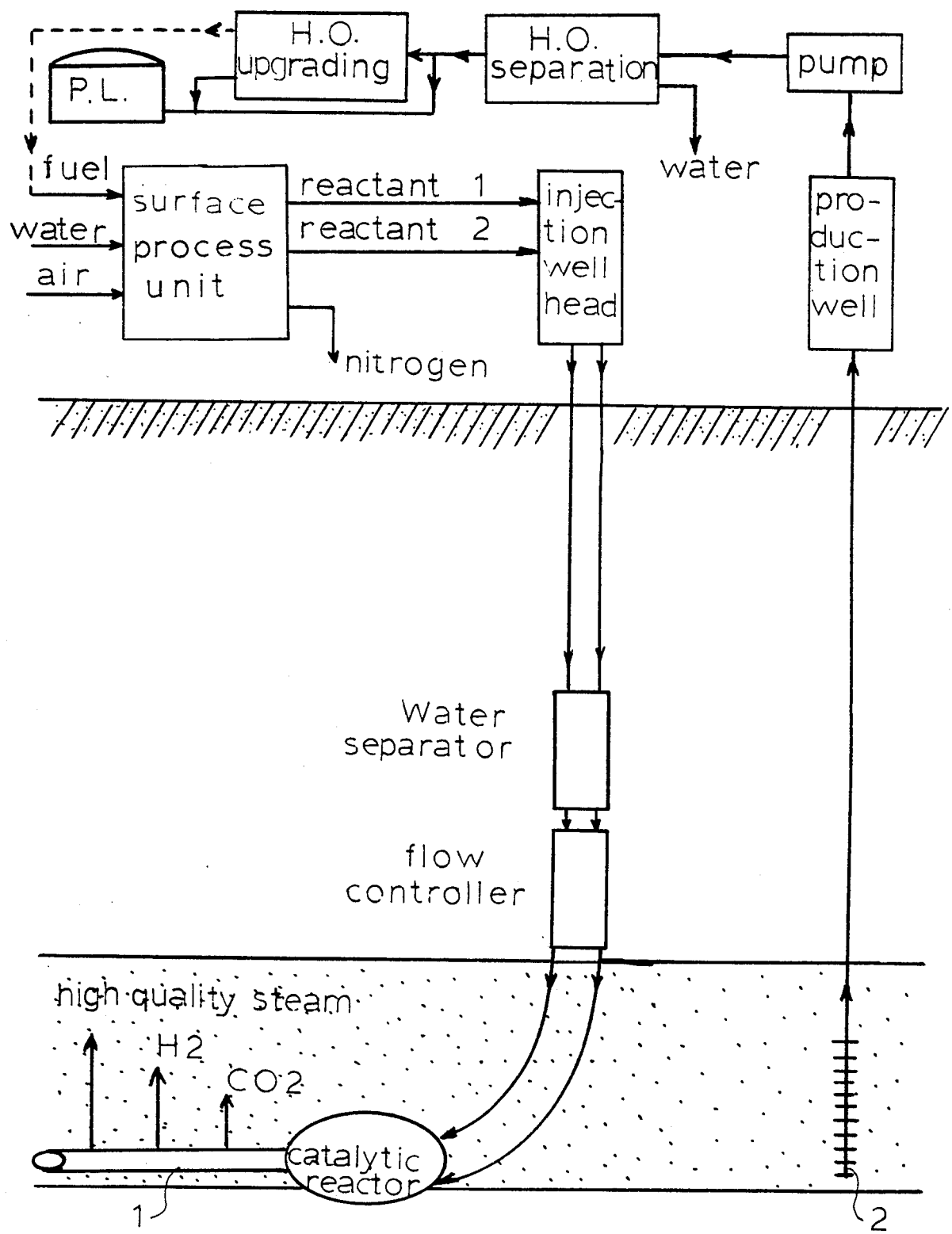
FIG. 1 is a schematic diagram of the heavy oil recovery process, showing the circulation of fluids above and below ground.

To form the mobile oil bank, a necessary step of the heavy oil recovery process, a mixture of high quality steam, hydrogen and oil soluble gases ($CO_2$ for instance) is injected into the reservoir by means of the top perforations of a horizontal cased injection well. The heat required to produce high quality steam downhole is provided by an exothermic catalytic reaction taking place in the catalytic reactor. The catalyst may be packed in a fixed bed or circulating in slurry form within the annular space between the reactor wall and one or several tubings, preferably concentric, feeding the reactants into the reactor. Suitable catalytic exothermic reactions for this process are those having the following characteristics:

(1) They yield $H_2O$ or $H_2$, $CO_2$ or any gas or vapor readily soluble in the heavy oil, such as $CH_4$, methanol, light hydrocarbons, etc . . .

(2) They are either independent of pressure or favored by high pressure.

(3) Single pass conversion rate is high at reservoir pressure and at the reaction temperature.

(4) The reaction temperature is such that water in contact with the catalyst is vaporized at a pressure equal to or greater than that of the reservoir. In practice this means that different reaction temperatures may be selected for different reservoir depths, according to the following simplified relationship: depth (in meters)/$10.5 \leq$ (Temperature, °C./100)$^4$ (1) Thus, for 1000 meter depth, the reaction temperature must be at least 312° C. and for a 2000 meter depth it must exceed 372° C. These temperatures are still considerably lower than those obtained by direct combustion of the reactants so the corrosion rates are much smaller than in downhole burners.

(5) The reaction products, when in contact with the heavy oil and reservoir connate water, do not create any significant amounts of solids susceptible of plugging the reservoir pores, or of sintering the catalyst particles.

(6) The catalysts are unaffected by the presence of water (this is of course the case of known industrial catalysts used in reactions where one of the reactants or one of the products is water).

(7) The catalysts are not permanently poisoned by constituents of connate water or heavy oil, which may accidently back flow into the catalyst bed or slurry.

(8) The exothermic catalyst reaction is reversible and its temperature may be controlled by adjusting the feed rate of water and/or that of at least one of the reactants.

(9) The catalyst has a low rate of de-activation.

Examples of reactions having suitable characteristics include:

the oxidation of hydrogen:

$$H_2 + \tfrac{1}{2}O_2 \rightleftharpoons H_2O (\Delta H° = -59.3 \text{ Kcal/g.mole}) \quad (2)$$

the water gas shift reaction:

$$H_2O + CO \rightleftharpoons CO_2 + H_2 (\Delta H° = -9.8 \text{ Kcal/g.mole}) \quad (3)$$

the methanation reactions:

$$CO + 3H_2 \rightleftharpoons CH_4 + H_2O (\Delta H° = -49.2 \text{ Kcal/g.mole}) \quad (4)$$

$$CO_2 + 4H_2 \rightleftharpoons CH_4 + 2H_2O (\Delta H° = -39.4 \text{ Kcal/g.mole}) \quad (5)$$

the Fischer Tropsch reactions:

$$2CO + H_2 \rightleftharpoons CO_2 + (-CH_2-)(\Delta H° = -44 \text{ Kcal/g.mole}) \quad (6)$$

$$CO + 2H_2 \rightleftharpoons H_2O + (-CH_2-)(\Delta H° = -35 \text{ Kcal/g.mole}) \quad (7)$$

5-the Methanol synthesis reaction:

$$2H_2 + CO \rightleftharpoons CH_3OH (\Delta H° = -23 \text{ Kcal/g.mole}) \quad (8)$$

It will become apparent to those skilled in the art that various other catalytic reactions may also be used without departing from the spirit and scope of the present invention.

Reaction (2) is the prefered reaction for recovering heavy oil at the greatest depths, because corrosive effects are minimized. The oxygen is liquified, pumped to the required pressure and vaporized. The water feed required for quenching the reaction and for controlling the catalyst temperature is transported in the annular space separating the gaseous oxygen stream from the hyrogen stream. Presently available compressors for pure hydrogen are limited to about 2000 psi, which would limit this application to depths of less than 4500 feet. Although this depth is already considerably greater than that for which known heavy oil recovery methods using steam injectors are applicable, a still higher pressure for the hydrogen injected into the well may be obtained by liquefaction and pumping of the liquid hydrogen, in the same manner as described for the injection of pure oxygen. For shallower application reactions, (3), (4) and (5) may be preferred, despite greater corrosion risks. In those cases, fixed bed catalytic reactors are preferred. Liquid water injected into the catalytic reactor is preferably kept separate from the $CO_2$ in the reactants (reaction 4). This requires a precise control of the water and gas flow rates into the reactor.

Suitable catalysts for reaction (2), oxidation of dihydrogen in the presence of excess $H_2$, include metals (Pt, Pd, Ni, Ph, Co) on a refractory oxide support, transition metal oxides ($Co_3O_4$, $MnO_2$, $NiO$, $CnO$), mixed oxides ($NiCo_2O_4$, $CnCo_2O_4$), and carbides (WC, $Cr_7C_3$, $Mo_2C$). The relative efficiency of these catalysts has been reviewed in Catalysis Science and Technology Volume 3, chapter 2, by G. K. Boreskov, edited by J. R. Anderson and M. Boudart, Springer Verlag, New York 1982. Commercially available catalysts include in particular C-53 (Pt-Ni on Alumina) C-54 (Pd on activated Alumina), supplied by Catalysts and Chemicals Inc., and supported Pd, Pt and Rh catalysts supplied by Matthey Bishop Inc.

Suitable catalysts for reaction (3) include iron-chromium ZnO-CuO, and more generally all catalysts used for water gas shift. Industrial catalysts available include C-18-3-02 (CuO on Alumina) supplied by Catalysts and Chemicals Inc., and 15-14 (iron oxide-chormia) supplied by Katalco Corp.

Suitable catalysts for reaction (4) and (5) include all known methanation catalysts, in particular Ruthenium, Rhodium and Nickel on Alumina supports. For reactions (6) and (7), the catalytic properties of carbides, nitrides, and carbonitrides of Fe are well known, as well as those of group 8 metals and group 6B metals, on Alumina and $ThO_2$ supports, with and without alkali metal promoters.

The catalysts for reaction (8) are also well known. They include mixed oxides of Cr and other transition metals. Their selection for the present application will be determined primarily by the requirement for high single pass yields and extended catalyst life.

DESCRIPTION OF THE SURFACE PROCESSES

In the preferred embodiment, the downhole reactants are obtained from the conversion of natural gas into hydrogen liquids, which may be illustrated by reaction (9):

$$6CH_4 \rightarrow C_6H_6 + 9H_2 \quad (9)$$

Hydrogen may also be obtained from the conversion into hydrocarbon liquids of the heavier constituents of natural gas illustrated by reaction (10):

$$3C_2H_6 \rightleftharpoons 6H_2 + C_6H_6 \quad (10)$$

Figure 2:
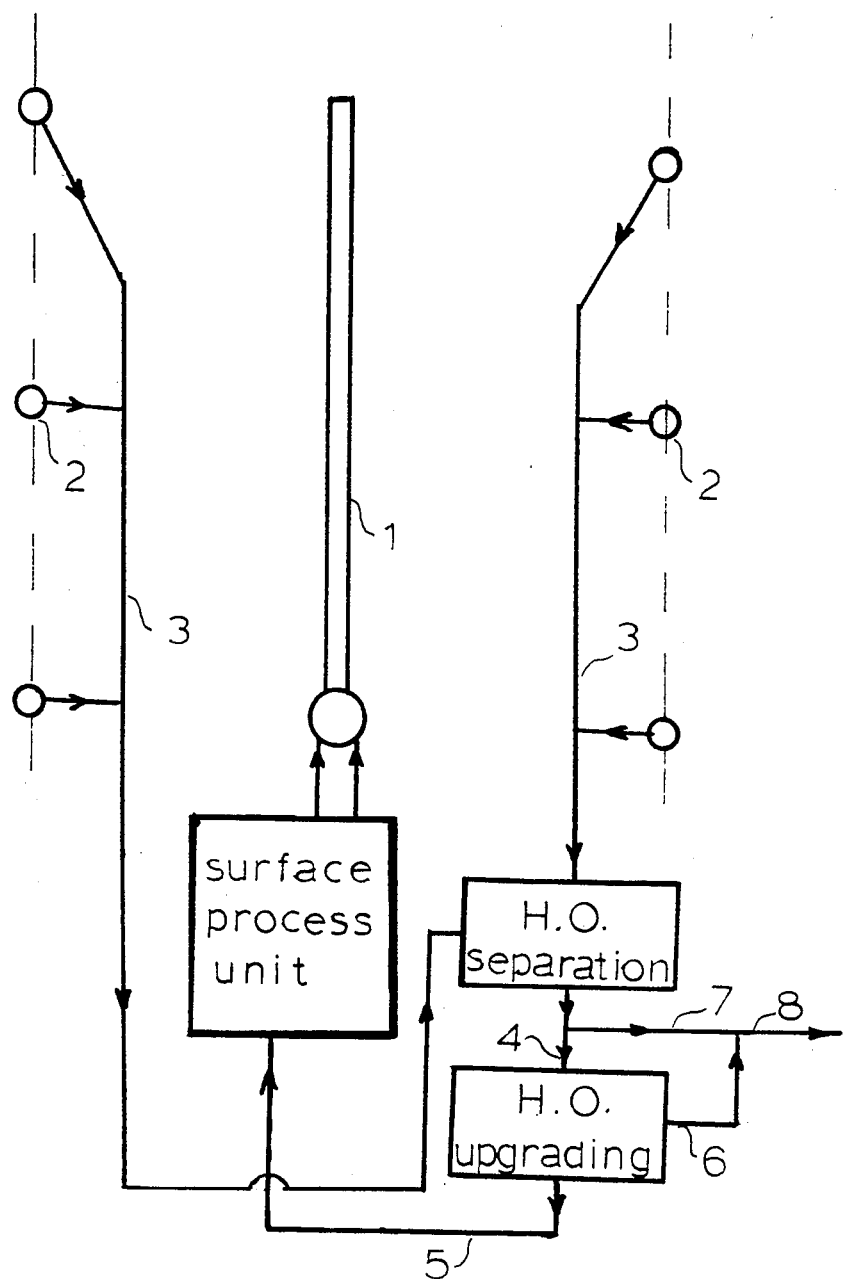
FIG. 2 is a surface map showing the respective locations of the horizontal injection well, vertical production wells, downhole reactor and controls, and surface process facilities for the production, fluid transport, separation and oil upgrading.
Figure 3:
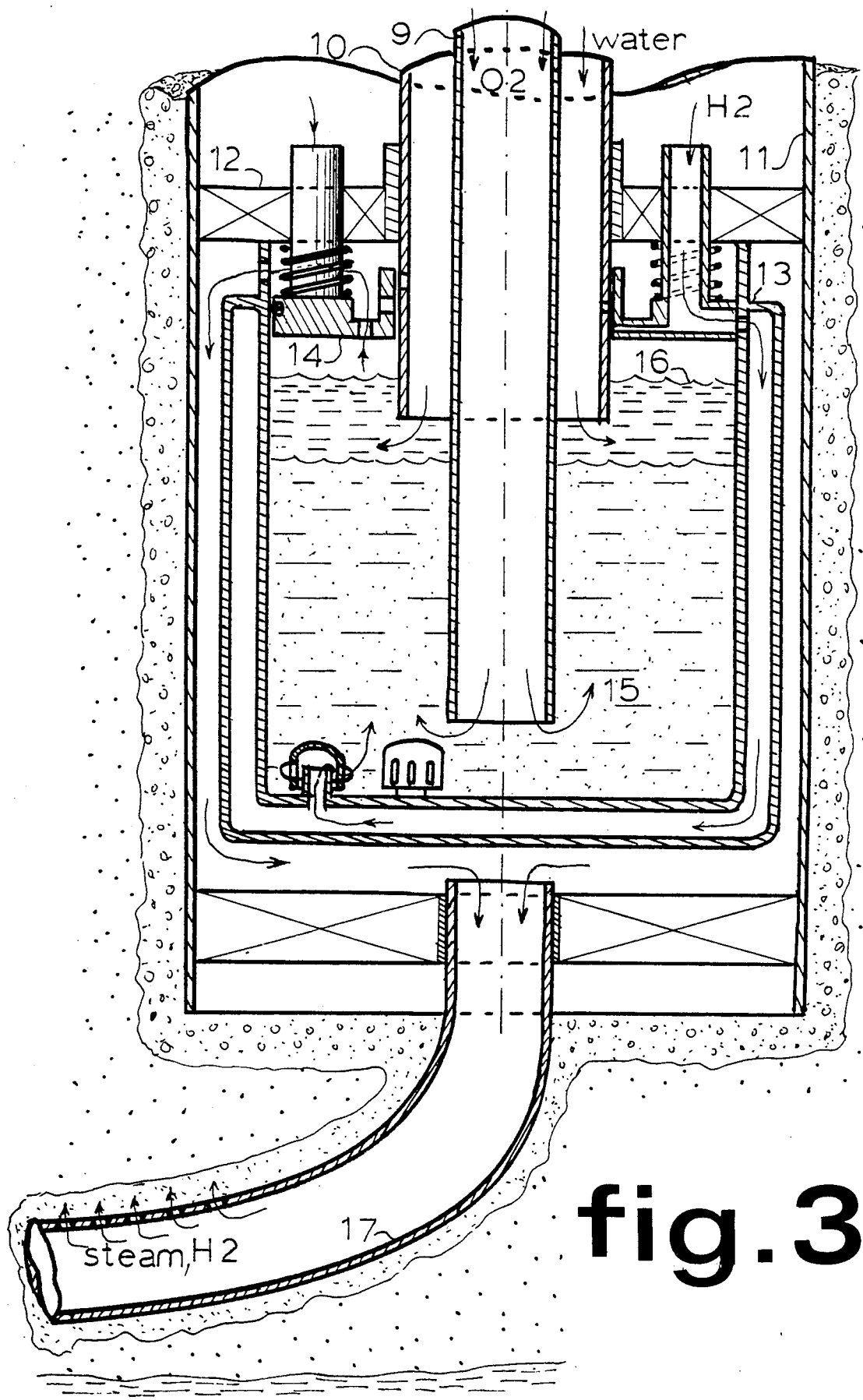
FIG. 3 is a vertical cross section of a vertical downhole catalytic reactor of the slurry type, feeding a horizontal injection well.
Figure 6:
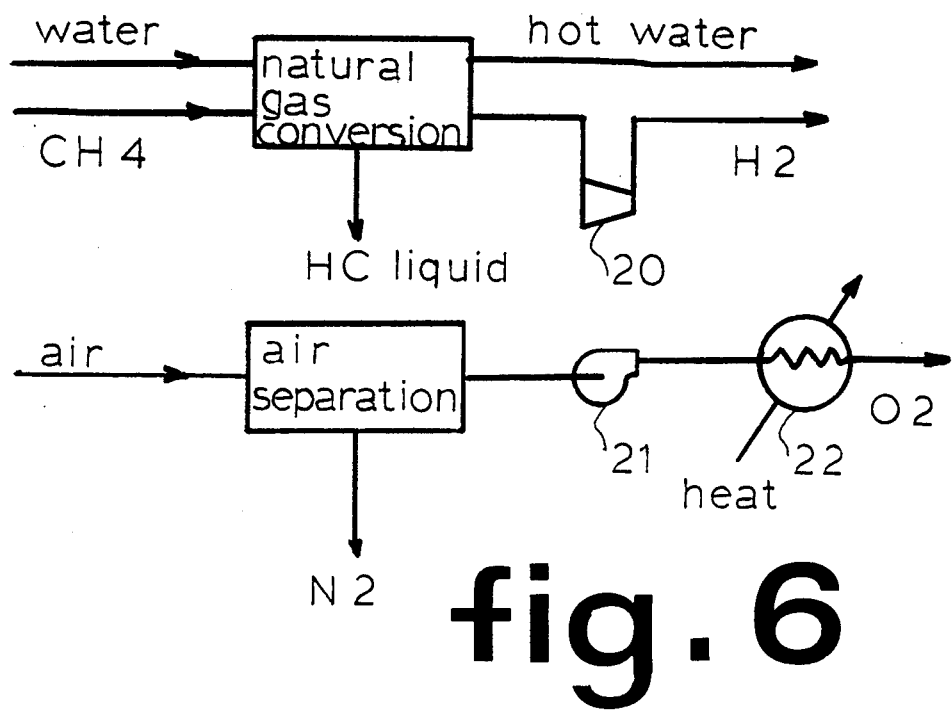
FIG. 6 is a schematic process flow diagram of the surface facilities required for producing only one pair of reactant streams, in which hydrogen is obtained as a by-product of Natural Gas conversion processes.
Figure 7:
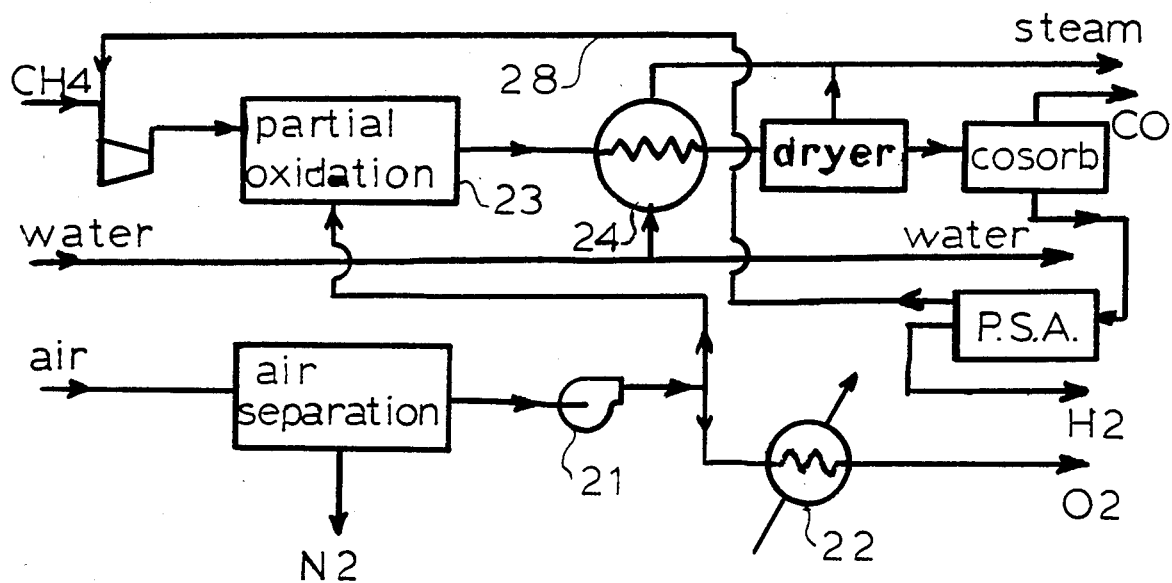
FIG. 7 is a process flow diagram of the surface facilities required for producing various reactant streams when using Natural Gas as fuel.
Figure 8:
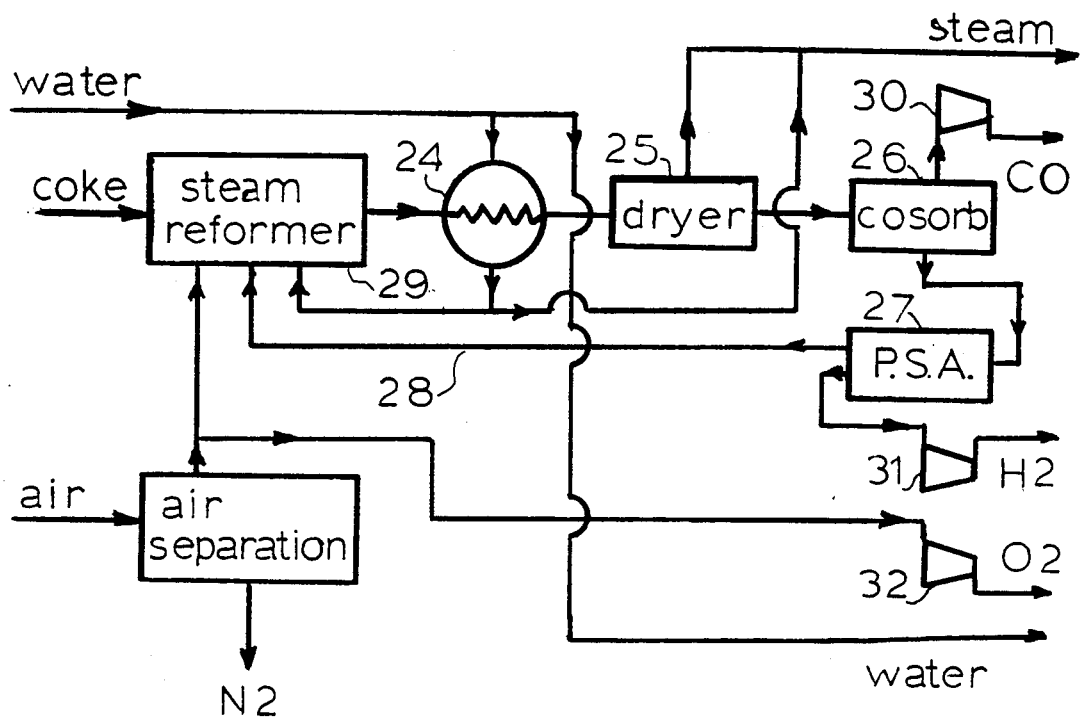
FIG. 8 is a schematic process flow diagram of the surface facilities required for producing the same reactants when using refinery coke or coal as fuel.

These processes include thermal dehydrogenation (Pyroform process) and/or catalytic dehydro-cyclo-dimerization (Cyclar process) using a feed stock which includes propane and butanes. The main advantage of these processes shown on FIG. 6 is that they provide a light hydrocarbon solvent for blending with the heavy oil produced, which, despite the "in situ" hydrogenation, remains more viscous than regular crude oil, and therefore difficult to transport. The mixture of solvent and produced heavy oil is compatible with the usual specifications for crude oil delivery into pipeline. This type of process, however, has not yet reached the industrial stage, whereas the processes of FIGS. 7, 8, and 9 have been used in many large installations for many years, for the production of H2, steam, and CO. For illustration purposes, various inexpensive fuels have been considered, corresponding to the following overall reactions:

$$nCH4 + O2 \rightleftharpoons nCO + 2H2O + (2n-2)H2 \tag{11}$$

for the process shown on FIG. 6, based on the partial oxidation of methane, and:

$$3C + O2 + H2O \rightleftharpoons 3CO + H2 \tag{12}$$

for the process shown on FIG. 7, based on steam reforming of carbon (coal or refinery coke). The refinery coke may be obtained as a by-product of the upgrading, by delayed coking for instance, of a portion of the heavy oil produced. The upgrading is for the purpose of making a light liquid suitable for blending with heavy crude. Suitable reactants are also yielded by:

$$n(CH2) + O2 + H2O \rightleftharpoons nCO + 3H2O + (n-2)H2 \tag{13}$$

for the process shown on FIG. 8, based on the autothermal steam reforming of residual liquid fuel. The residual liquid fuel may also be a by-product of upgrading the heavy oil produced. In all cases, it is essential to use a fuel available at low cost on the site of the heavy oil field, because it is a major part of the production cost of heavy oil. The known heavy oil recovery process by steam injection, which is applicable only to shallow reservoirs, often uses a large portion of the lease crude produced as fuel for the surface steam boilers, but the flue gases of these boilers are an objectionable source of atmospheric pollution. By using only the residues (coke or residual liquid fuel) from the upgrading of heavy oil as a feed stock for the surface processes, a smaller portion of the produced heavy oil is required by the recovery process. By injecting downhole all the reaction products of these processes, atmospheric pollution can be made negligible. By integration of facilities required for heavy oil upgrading, with those required for the production at the surface of the downhole reactants, and with the conventional heavy oil separation facilities, significant economies of scale can be realized, and the overall energy efficiency may be increased. Whereas in the known process the surface steam boilers are preferably distributed at many locations on the heavy oil field, in close proximity of the injection well heads, the present invention makes it possible to concentrate most of the surface facilities at a single location. In fields where several heavy oil zones are superposed at various depths, it is advantageous to combine several of the recovery processes described above. Shallower reservoirs (1000 Feet or deeper) for instance, may receive as reactants low quality steam CO and CO2 for downhole conversion by reaction (3), while deeper zones receive as reactants H2, O2 and water, for downhole conversion by reaction (2). The produced oils from the various zones may then be commingled in all the surface facilities required for crude separation and upgrading. The synergy of these various surface processes makes it possible to integrate process facilities for greater economy and efficiency. Such an integration of surface facilities is shown schematically on FIG. 1. For simplicity, however, only one pair of reactants was assumed to be produced from the surface process unit for supplying a single injection well (1). These reactants No. 1 and No. 2 may be for instance H2 and O2, plus water or they may be CO and steam, plus water. For the same reason only a single production well (2) is shown, even though a plurality of vertical production wells is usually required. One or several horizontal production wells may also be substituted for the vertical production well shown on FIG. 1. FIG. 2 shows the respective surface locations of the process facilities as well as the subsurface locations (in plain view) of a horizontal injection well (1) and of the associated vertical production wells (2). The production well flow lines (3) feed the oil separation facility which feeds a portion (4) of the heavy oil (H.O.) to the H.O. upgrading facilities. The residue (5) from the oil upgrading process is supplied as fuel to the surface process facilities. The upgraded oil (6) and the heavy oil (7) are blended for shipment to the crude pipeline (8). FIG. 3 shows the downhole vertical slurry reactor used for reaction (2). The oxygen stream is fed through the central tubing (9). Water is fed via the annulus between the central tubing and second concentric tubing (10). Hydrogen is fed via the annular space between the second tubing and the well casing (11). A packer (12) isolates the upper part of the well from the downhole reactor (13). A system of spring-loaded valves (14) operated by a go-devil or by electrical wire line tools allows communication between the central tubing and each of the two surrounding annulus spaces and between the outer annulus above the packer and the outer annulus around the downhole reactor. The design and operation of this type of downhole valve is well known of those skilled in the art, and it will not be described in detail, but only its functions will be listed in some detail.

In the injection mode, under normal operation of the downhole reactor, the valve system is in the position shown on FIG. 3, with hydrogen supplied across the packer (12) into the outer annulus inside the reactor vessel (13), and from there into the bottom of the reactor, by means of bubble cap distributors, for instance. Oxygen is injected into the bottom part of the slurry reactor (15) where it reacts with the hydrogen stream in the presence of the catalyst particles suspended in water. The water level (16) is kept constant by automatically adjusting the flow of water into the reactor. The steam produced in the reaction and the steam vaporized from the injected water flows around the spring loaded valve system into the annulus between the well casing (11) and the reactor vessel (13), and from there into the liner of the horizontal injection well (17). The automatic water level control system is not detailed. Its operating specifications are given in Table 1. To switch the well from the injection mode, the spring-loaded valve system is actuated (either by one or several go-devils, and/or by wireline tools lowered into the central tubing. The valve positions are such that the following sequence of operations is achieved:

(a) oxygen is displaced by nitrogen injected into the central tubing.

(b) water is injected into the reactor and into the outer annulus in order to purge the well of its hydrogen content.

(c) the communication between the outside annulus below the packer and the vapor space inside the reactor is closed and replaced by a communication with the outer annulus above the packer.

(d) the outer annulus pressure above the packer is reduced by establishing communication with the central tubing into which N2 is injected. This allows the flow of the mobile bank from the reservoir into the horizontal well, and from there around the reactor and into the outer annulus above the packer. Continued injection of nitrogen or of a gas lift gas lightens the oil column to bring the heavy oil to the surface. Following the period of production, the spring loaded valve system may be operated again to allow the circulation of the spent catalyst slurry to the surface, via the annulus between the first and second tubing. With the reactor loaded with a fresh catalyst slurry, the spring loaded valve is returned to its original position for a new cycle of steam injection. To trigger the reaction, the reactor is first heated by a circulation of hot water under high pressure, established from the outer annulus above the packer, into the reactor and out via the annulus between first and second tubing. Once the reactor temperature has reached the level at which the catalytic oxidation reaction can start, the water circulation is stopped, and injection of the H2 and O2 streams into the reactor is resumed, thus starting a new cycle of operation in the steam injection mode. As an example, the relative mole fractions of oxygen, hydrogen, and water in the feed of the downhole reactor are as follows:

O2: 0.05
H2: 0.55
H2O: 0.40

The injection conditions are: Injection pressure: 2000 psia Injection temperature: 640° F.

For one mole of feed, the reaction products at the injection conditions are:

steam: 0.50 mole
H2: 0.45 mole

Although the operation of the vertical downhole slurry reactor has been described for the reaction (2) process, a similar reactor may be used for reactions (3), (4), (5), (6), and (7). In the case of reaction (3), the steam injection is made through the central tubing. The annulus between the two concentric tubings is used as a water/steam separator. The CO reactant is injected in the outer annulus. For reactions (4), (5), (6), and (7), the oxygenated reactants (CO, CO2) are preferably injected through the central tubing, and hydrogen through the outer tubing, with water injected in the middle annulus, between the concentric tubings. The reaction temperature is controlled by adjusting the relative flow rates of H2 and CO, CO2, and that of water to be vaporized in the reactor.

Figure 9:
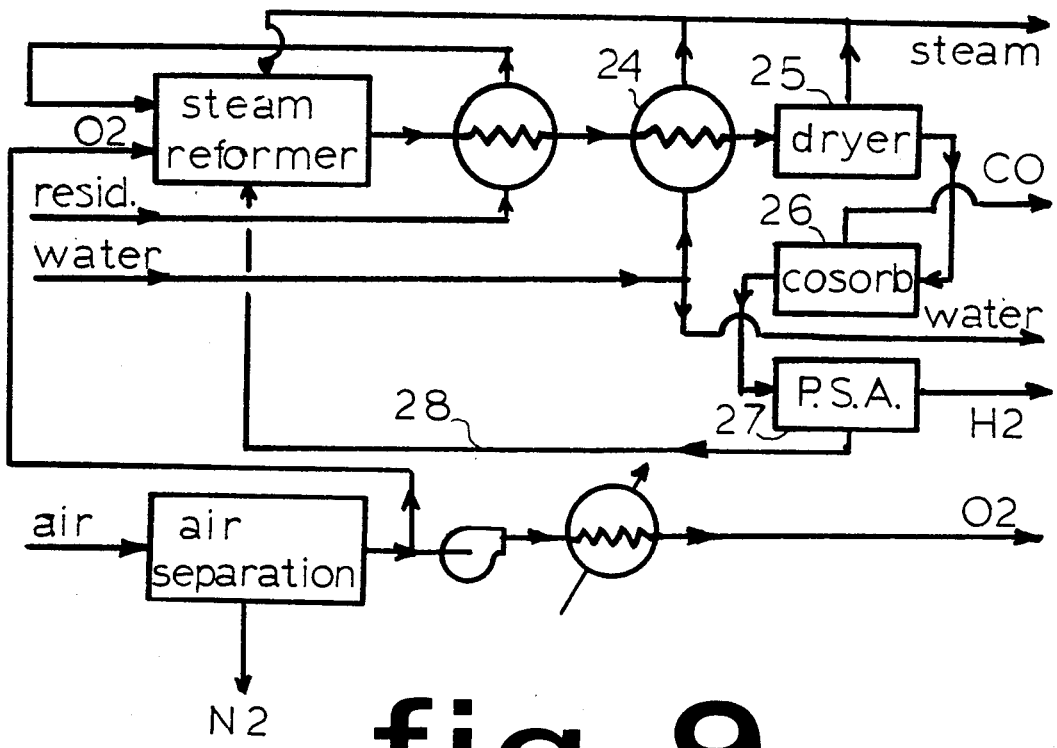
FIG. 9 is a schematic process flow diagram of the surface facilities required for producing the same reactants when using residual liquid fuel as plant feed.

FIGS. 4 and 5 show another type of downhole reactor, a fixed bed catalytic reactor packed preferably within the horizontal injection well itself. FIG. 4 is a longitudinal cross section, and FIG. 5 a transverse cross section of this combined reactor and injection well. In this case, the injection well can no longer be operated in a "huff and puff" mode, but only as an injector, the mobile heavy oil being swept into separate production wells (not shown on these figures). This type of downhole reactor is particularly suitable for reactions (3) to (8), which proceed at lower rates than reaction (2) with gaseous reactants. Water and one of the oxygenated reactants (steam, CO and CO2) are injected into the reactor by means of at least one perforated tubing (18). This tubing is located within the horizontal well casing or liner, and lies on the low side of the casing, which is perforated only on its top quadrant. Catalyst particles (19) are packed within the annular space. As an example, the reactor feed may include the following components:

CO: 0.30 mole fraction
steam: 0.30
water: 0.40 (steam quality: 0.57) at an injection pressure of 1000 psia, into a reservoir at a 2000 Feet depth. Assuming a 90% conversion efficiency, in the reactor, the product stream injected in the reservoir contains:
CO: 0.03 mole fraction
CO2: 0.27
H2 0.27 superheated steam 0.43 and the heat rate resulting from the injection of this gaseous mixture into the reservoir is increased by a factor of 1.45 relative to that of the steam/water mixture in the reactor feed. For reactions (4) to (8), hydrogen, in excess relative to the stoichiometric ratio required by the oxygenated reactants feed is injected in the annular space. A portion of the hydrogen stream reacts with the oxygenated reactant (CO or CO2). The reaction products, in vapor phase, together with the excess hydrogen, penetrate vertically into the reservoir through the casing perforations. The heat of the reaction also vaporizes water injected into the tubing. The resulting steam traverses the catalyst bed and also penetrates into the reservoir via the casing perforations. For reaction (3), the CO reactant stream may be injected either through the annulus, in the same way as hydrogen, or mixed with steam in the tubing. A packer (12) and an automatic water level control (18) adjust the relative flows of water and of reactants according to the specifications of Table 1. To initiate the reaction, the catalyst bed is pre-heated by injection of steam, followed by injection of the CO stream when the bed has reached the temperature required for the reaction to start. Initiation of reactions (4) to (8) is achieved by a downhole electrical heater (not shown), or by use of hypergolic mixtures. FIG. 6 is a schematic process flow diagram showing the disposition of products from a surface process facility providing as a by-product hydrogen from a natural gas conversion plant. The hydrogen stream is compressed to the injection pressure in a compressor (20). Oxygen is obtained in liquid form from a cryogenic oxygen plant. It is then pumped to the injection pressure with a cryogenic pump (21) and then re-vaporized in a heat exchanger (22). The process provides a single pair of reactants, H2 and O2, plus liquid water. In addition the process products include nitrogen for rejection to the atmosphere or for use as purge gas or NH3 synthesis, and a light liquid hydrocarbon mixture resulting from natural gas conversion, which is blended with the produced heavy oil to reduce its viscosity. The feed streams are respectively: natural gas or natural gas liquids, air and water. FIG. 7 is a schematic process flow diagram showing the simultaneous preparation of two pairs of reactants: H2 and O2 (plus liquid water), CO and steam (plus condensed water). Each pair of reactants is injected into a separate downhole reactor. The two reactors may be respectively of the slurry type (as shown on FIG. 3) and of the fixed bed type (as shown on FIG. 4). The process feed streams are: natural gas, air and water. In addition to the two pairs of reactants, the process produces a nitrogen residue stream. The process is based on partial oxidation of natural gas in a high pressure reactor (23). The reactor effluent provides heat to a steam boiler (24) and is then sent to a drying unit (25) for water removal. The dry effluent is then sent to a CO removal unit (26) using the COSORB process for instance. After CO extraction, the effluent contains H2, CO2 and unconverted natural gas. Hydrogen is separated in a Pressure Swing Adsorption (P.S.A.) unit (27) and the residual gas (28) containing CO2 and CH4 is recycled to the partial oxidation reactor. The oxygen feed to the partial oxidation reactor is supplied by a cryogenic oxygen plant, leaving as a by-product a nitrogen stream for rejection to the atmosphere, or for use as inert gas or lift gas. Other Syngas preparation processes may also be used. Other CO removal processes, such as cryogenic separation, may be substituted to the COSORB and PSA processes, but in that case CO2 must first be removed from the cryogenic separation unit feed stream, using processes which are well known to those skilled in the art. FIG. 8 shows a schematic process flow diagram for the simultaneous production of the same two pairs of reactants as in FIG. 7, based on the steam reforming of carbon in the form of refinery coke, for instance, obtained as a by-product of heavy oil upgrading in a delayed coking or Flexicoking unit (not shown). The effluent from the steam reformer (29) is subjected to the same processes (24), (25), (26), and (27), as in FIG. 7, but the recycle stream (28) is now composed primarily of CO2. The product streams, CO, H2 and O2, are obtained at a lower pressure than in the process of FIG. 7 and are then compressed in compressors (30) (31) and (32) respectively. Other known processes where air is used instead of oxygen as feed to a steam reformer and nitrogen is extracted from the reaction products are also applicable, including those using tubular steam reformer furnaces. FIG. 9 shows a schematic process flow diagram for the preparation of the same reactant streams, based on the auto-thermal steam reforming of residual fuel oil. The feed streams into the auto-thermal reformer are respectively: residual fuel oil, steam and oxygen. The remainder of the process is identical with that of FIG. 8. FIGS. 10 and 11 are respectively a surface map and a vertical cross section showing the relative locations of a horizontal injection well (33), and of two horizontal production wells (34) (35) drilled perpendicular to a network of vertical fractures (36). The respective fronts of hydrogen (37), condensing steam (38), and hydrogenated oil (39), are also shown. While only a few embodiments of the invention have been shown and described herein, many possible combinations and modifications are possible without departing from the spirit and scope of the present invention. All such combinations and modifications coming within the scope of the appended claims are intended to be covered thereby. The chemical reactions involved in the "in situ" hydrogenation process may vary depending on the heavy oil composition, reservoir pressure and reservoir rock type. They include in particular: hydrocracking, hydroisomerization, hydrodealkylation, hydrodesulfurization, etc . . . Their combined effects in all cases, however, are to reduce the heavy oil viscosity and to promote the formation of a mobile oil bank. The term "hydrogenation" in the appended claims covers all such reactions contributing to render mobile the heavy oil or a fraction thereof. "Oil soluble gases and/or oil soluble vapors," injected into the reservoir as part of some of the recovery processes described herein and claimed, are also partly soluble in the connate water. This may change the water-oil interfacial tension and alter the reservoir rock wettability. These effects, which may contribute to the formation of the mobile oil bank, are recognized and are intended to be covered by the appended claims. Various chemical additives, such as amines which can be produced at the surface from the same feed stocks, may be added to the water stream supplied to the injection well for protection against corrosion and for enhancing the effect of the hydrogenation catalysts naturally present in the heavy oil and reservoir rock. This last effect is well documented in "the chemistry of catalytic hydrocarbon conversions" by Herman Pines, Pages 152 to 155, Academic Press, 1981, New York. The processes required for producing such additives are included in the scope of the surface processes associated with "in situ" hydrogenation of heavy oil.

TABLE 1

Downhole Flow Control System Operation

Operation of the flow control valves is determined by at least 2 sensors measuring respectively:

(a) the liquid level in the reactor: L
(b) the catalyst temperature: T

The sensors readings are automatically compared with pre-determined minimum and maximum values of these parameters:
Lmin and Lmax, Tmin and Tmax.

The operation is described for reaction (2);

If $L \geq Lmax$ and $T \leq Tmin$, the inlet valves are in the following positions:
O2: open
H2: open
water open.

If $L \leq Lmax$ and $T \geq Tmin$, the inlet valve positions are:
O2: closed
H2: open
water open.

If $L \geq Lmax$ and $T \leq Tmax$, the steam outlet valve is open and the inlet valve positions are:
O2: closed
H2: open
water closed.

If $L \leq Lmax$ and $Tmin \leq T \leq Tmax$, the steam outlet valve is closed and the inlet valve positions are:
O2: closed
H2: open
water open.

Similar flow control sequences apply to reactions (3) to (8).

I claim:

1. A process for the recovery of heavy oil from reservoirs deeper than 1,000 feet wherein surface facilities produce various chemical reactants, in gaseous form, and water for feeding into an injection well and for transferring said reactants via feeder tubings to a downhole reactor where, in the presence of a suitable catalyst, a reversible exothermic reaction takes place, converting said reactants and water into a gaseous mixture containing Hydrogen and high quality steam at a temperature such that, at the pressure required for injection of said mixture into the reservoir, hydrogenation of the heavy oil is initiated and proceeds at a rate sufficient to approach equilibrium within the duration of oil production from the reservoir drainage area associated with said injection well; said gaseous mixture exiting at high pressure from said downhole reactor, where both Hydrogen and steam are in direct contact with said catalyst, is then injected into the reservoir, contacts the heavy oil over a large area and, through hydrogenation and viscosity-reduction of said heavy oil, forms around said injection well a mobile oil bank which grows in time and ultimately flows into the surrounding production wells.

2. A process according to claim 1 wherein chemical reactants, including water, produced in surface facilities, when injected together into the downhole reactor have a non stoichiometric chemical composition and physical properties determined by one or several of the following chemical processes used in said surface facilities:
  natural gas conversion,
  natural gas liquids aromatization,
  natural gas partial oxidation,
  catalytic steam reforming and water gas shift,
  air separation,
  boiler feed water preparation,
  steam generation,
  gas compression; said chemical processes being applied to the following feed stocks: water, air and at least one of the fuels listed below:
  natural gas or components thereof,
  coal or lignite,
  refinery coke,
  residual fuel oil; some of the said fuels being obtained as by-products of heavy oil upgrading.

3. A process according to claim 1 wherein the gaseous mixture produced in said downhole catalytic reactor contains, in addition to Hydrogen and high quality steam, some oil soluble gases and/or oil soluble vapors, preferably comprising: Carbon dioxide, methane, light hydrocarbons and methanol.

4. A process according to claims 1 or 3 wherein said reversible exothermic catalytic reaction taking place in said downhole reactor has the following characteristics:
  (1)-It yields H2O, or H2, CO2, or any gas or vapor soluble in heavy oil,
  (2)-It is independent of pressure or favored by high pressure,
  (3)-Single-pass conversion rate is high at reservoir pressure and at the reaction temperature,
  (4)-The reaction temperature, in °C., exceeds a value equal to 100 multiplied by the fourth root of a fraction equal to the reservoir depth, in meters, divided by 10.5 and it is controllable by adjusting the feed rates of water and of the reactants,
  (5)-No significant amounts of solids are produced when reaction products are in contact with the heavy oil and reservoir connate water,
  (6)-The catalyst has a low rate of deactivation; it is unaffected by water; it is not permanently poisoned by constituents of the connate and heavy oil; preferred reactions include:
    the oxidation of dihydrogen,
    the water gas shift reaction,
    the methanation reactions,
    the Fischer-Tropsch reactions,
    the methanol synthesis reaction.

5. A process according to claim 3 wherein said gaseous mixture is produced from a fixed bed catalytic reactor located downhole.

6. A process according to claim 5 wherein the catalyst fixed bed is packed in the annular space between the casing or liner of said injection well, and one or several tubings feeding respectively the gaseous reactants and water into said downhole reactor.

7. A process according to claim 6 wherein the angle of deviation from the vertical of said injection well approaches 90° and the well penetrates into the lower part of the heavy oil reservoir by means of a perforated casing or liner so as to enhance the contact of Hydrogen, steam and soluble gases with heavy oil over a large area of the reservoir.

8. A process according to claim 1 wherein said downhole catalytic reactor is a vertical slurry reactor feeding a horizontal injection well drilled near the base of the heavy oil reservoir so as to maximize the area over which said gaseous mixture contacts the heavy oil.

9. A process according to claim 8 or 5 wherein the reactor temperature is controlled downhole to a predetermined value by automatically adjusting the respective rates of water and of individual reactants, so that a non stoichiometric reactor feed composition, including excess water or hydrogen, is achieved.

10. A process according to claim 9 wherein the reactor temperature may also be controlled from the surface through downhole flow control valves to switch the fluid paths within the well and to convert the injection well into a production well, while the downhole reactor is shut down.

11. A process according to claims 8 or 7 wherein the horizontal injection wells are surrounded by vertical production wells arranged in rows approximately parallel to said horizontal wells, and said production wells are subjected to pumping or gas lift.

12. A process according to claims 8 or 7 wherein the horizontal injection wells are surrounded by horizontal production wells drilled approximately parallel to said injection wells, but at shallower depths.

13. A process according to claim 12 wherein the horizontal injection and production wells are oriented in a direction approximately perpendicular to the prevailing orientation of vertical fractures in the heavy oil reservoir.

14. A process according to claims 1 or 3 wherein the hydrogenation of heavy oil within the reservoir is catalyzed by organic bases, including amines and ammonia, which are injected as additives to the water phase.

* * * * *